(12) United States Patent
Kobayashi et al.

(10) Patent No.: US 11,591,077 B2
(45) Date of Patent: Feb. 28, 2023

(54) VIBRATION CONTROL SYSTEM FOR COMPOUND HELICOPTER

(71) Applicants: SUBARU CORPORATION, Tokyo (JP); Japan Aerospace Exploration Agency, Chofu (JP)

(72) Inventors: Wataru Kobayashi, Tokyo (JP); Hirotaka Hayashi, Tokyo (JP); Mizuki Nakamura, Tokyo (JP); Masafumi Sasaki, Tokyo (JP); Yasutada Tanabe, Chofu (JP); Noboru Kobiki, Chofu (JP); Hideaki Sugawara, Chofu (JP)

(73) Assignees: SUBARU CORPORATION, Tokyo (JP); JAPAN AEROSPACE EXPLORATION AGENCY, Chofu (JP)

( * ) Notice: Subject to any disclaimer, the term of this patent is extended or adjusted under 35 U.S.C. 154(b) by 0 days.

(21) Appl. No.: 17/334,311

(22) Filed: May 28, 2021

(65) Prior Publication Data

US 2021/0371092 A1 Dec. 2, 2021

(30) Foreign Application Priority Data

Jun. 1, 2020 (JP) .............................. JP2020-095179

(51) Int. Cl.
  *B64C 27/26* (2006.01)
  *B64C 27/00* (2006.01)
  *B64C 13/50* (2006.01)

(52) U.S. Cl.
  CPC ............ *B64C 27/26* (2013.01); *B64C 27/001* (2013.01); *B64C 13/50* (2013.01); *B64C 2027/004* (2013.01)

(58) Field of Classification Search
  CPC ....... B64C 27/001; B64C 13/50; B64C 27/26; B64C 13/16
  See application file for complete search history.

(56) References Cited

U.S. PATENT DOCUMENTS

| 5,588,800 A | * | 12/1996 | Charles | ................. B64C 27/001 416/24 |
| 6,135,713 A | * | 10/2000 | Domzalski | ............ B64C 27/615 416/104 |
| 6,168,379 B1 | * | 1/2001 | Bauer | ................... B64C 27/615 244/90 R |

(Continued)

FOREIGN PATENT DOCUMENTS

JP H03-121996 A 5/1991

OTHER PUBLICATIONS

Extended European Search Report dated Oct. 19, 2021 for European Patent Application No. 21175975.8-1010.

*Primary Examiner* — Joshua J Michener
*Assistant Examiner* — Cindi M Curry
(74) *Attorney, Agent, or Firm* — McGinn I.P. Law Group, PLLC

(57) ABSTRACT

Provided is a vibration control system for a compound helicopter with a rotor and a fixed wing. The fixed wing includes a movable flap that is mounted on a rear edge of the fixed wing. The vibration control system periodically moves the movable flap so as to periodically change lift of the fixed wing such that vibration aerodynamically generated by the fixed wing is in anti-phase with vibration caused by rotation of the rotor.

18 Claims, 3 Drawing Sheets

(56) References Cited

U.S. PATENT DOCUMENTS

| | | | |
|---|---|---|---|
| 6,200,096 B1* | 3/2001 | Kohlhepp | B64C 27/001 |
| | | | 416/158 |
| 6,295,006 B1* | 9/2001 | Kohlhepp | B64C 27/001 |
| | | | 244/17.11 |
| 9,902,492 B1* | 2/2018 | Sonneborn | B64C 27/02 |
| 2002/0005456 A1* | 1/2002 | Toulmay | B64C 27/001 |
| | | | 244/17.13 |
| 2005/0151001 A1* | 7/2005 | Loper | B64C 27/26 |
| | | | 244/6 |
| 2007/0131820 A1* | 6/2007 | Chaudhry | B64C 27/001 |
| | | | 244/17.25 |
| 2017/0158348 A1* | 6/2017 | Teubner | B64C 13/50 |
| 2021/0323659 A1* | 10/2021 | Zhang | B64C 27/82 |

* cited by examiner

# VIBRATION CONTROL SYSTEM FOR COMPOUND HELICOPTER

CROSS REFERENCE TO RELATED APPLICATIONS

This application is based upon and claims the benefit of priority under the Paris Convention of Japanese Patent Application No. 2020-095179 filed on Jun. 1, 2020, the entire disclosure of which, including the specification, claims, drawings and abstract, is incorporated herein by reference in its entirety.

BACKGROUND

The present disclosure relates to a vibration control system for a compound helicopter.

A lot of research has been conducted on a compound helicopter with a rotor 101 and fixed wings 102 as shown in FIG. 5 (for example, see JPH03-121996A).

In a rotorcraft with a rotor including a compound helicopter, it is known that flight crews feel uncomfortable because periodic vibration caused by rotation of the rotor is transmitted to the body and causes the cabin to vibrate.

Conventionally, there have been active vibration control systems and the like for suppressing such vibration caused by the rotation of the rotor.

In an active vibration system, a heavy lead portion or the like is caused to vibrate in the vertical direction in anti-phase with the vibration caused by the rotation of the rotor with the same period.

An aspect of the present disclosure provides a vibration control system for a compound helicopter with a rotor and a fixed wing.

The fixed wing includes a movable flap that is mounted on a rear edge of the fixed wing.

The vibration control system periodically moves the movable flap so as to periodically change lift of the fixed wing such that vibration aerodynamically generated by the fixed wing is in anti-phase with vibration caused by rotation of the rotor.

BRIEF DESCRIPTION OF DRAWINGS

The accompanying drawings are not intended as a definition of the limits of the disclosure but illustrate embodiments of the disclosure, and together with the general description given above and the detailed description of the embodiments given below, serve to explain the principles of the disclosure, wherein.

DETAILED DESCRIPTION OF EMBODIMENTS

In a compound helicopter, vibration caused by rotation of a rotor is transmitted to fixed wings, and causes ends of the fixed wings to vibrate upward and downward, which results in vibration of the body. Thus, in order to suppress vibration caused by the rotation of the rotor, it is effective to cause the ends of the fixed wings to vibrate in anti-phase.

However, it is difficult to cause a lead portion or the like to vibrate at the ends of the fixed wings which have a quite small width in the up-down direction.

The present disclosure has been conceived in view of the above, and has an object of providing a vibration control system for a compound helicopter which can effectively suppress vibration caused by rotation of a rotor in a compound helicopter with a rotor and fixed wings.

Hereinafter, one or more embodiments of the vibration control system for the compound helicopter according to the present disclosure are described with reference to the drawings. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The up-down, front-back, and left-right directions are described according to the respective directions in the compound helicopter.

Figure 1:
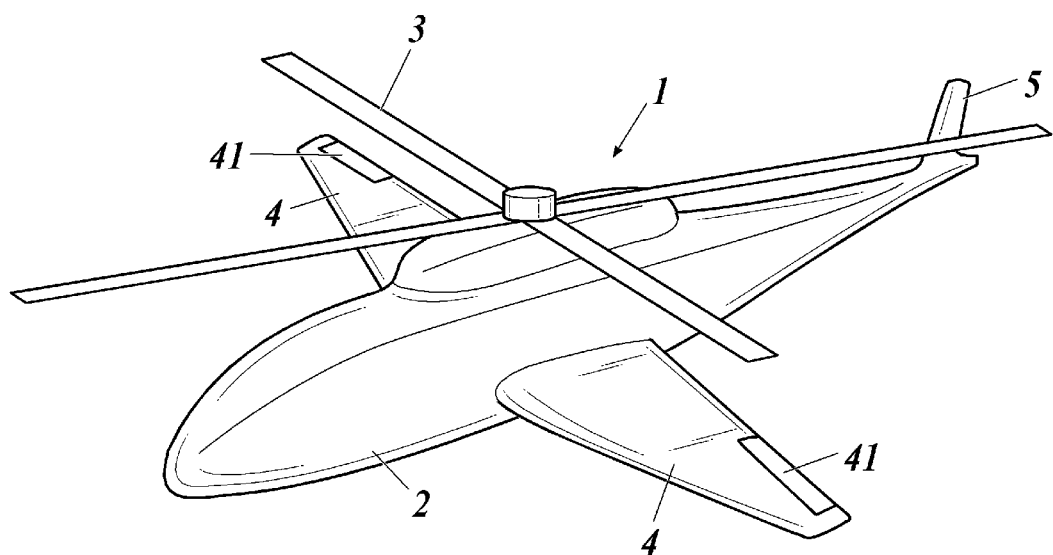
FIG. 1 shows a configuration of a compound helicopter according to an embodiment.
Figure 1:
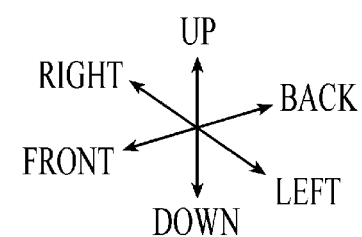

FIG. 1 shows a configuration of the compound helicopter according to the present embodiment.

The compound helicopter 1 mainly includes a body 2, a rotor 3, fixed wings 4, and a vertical stabilizer 5. Though not shown in the drawings, a propulsion system such as a propeller and a jet engine may be provided on the body 2 (on its front, rear, or side), the fixed wings 4, or the like, and a tail rotor or the like may also be provided.

The number of blades of the rotor 3 of the compound helicopter 1 is not limited to four as in FIG. 1.

In the present embodiment, the fixed wings 4 are respectively provided on the left and right sides of the body 2. Though not shown in the drawings, an aileron or the like may be provided on each of the fixed wings 4, and a rudder may be provided on the vertical stabilizer 5.

Movable flaps 41 are respectively mounted on the left and right fixed wings 4.

Though in FIG. 1, each of the movable flaps 41 is mounted near the edge of the fixed wing 4 only, the movable flap 41 may be extended along the entire rear edge of the fixed wing 4, or mounted near the wing root of the fixed wing 4.

There are many types of the movable flaps 41. For example, the movable flap 41 may be configured to be swingable upward and downward as shown in FIG. 2.

In the present embodiment, an actuator 6 is provided to cause the movable flap 41 to swing upward and downward.

The actuator 6 is not particularly limited as long as it can cause the movable flap 41 to swing upward and downward. But with the actuator using a piezoelectric element, which can be compressed and tensioned with a shorter period, the movable flap 41 can be caused to swing with a shorter period, and in addition, the movable flap 41 can be caused to swing with a mechanism using movable parts. As a result, the mechanical durability and reliability can be improved.

Figure 2:
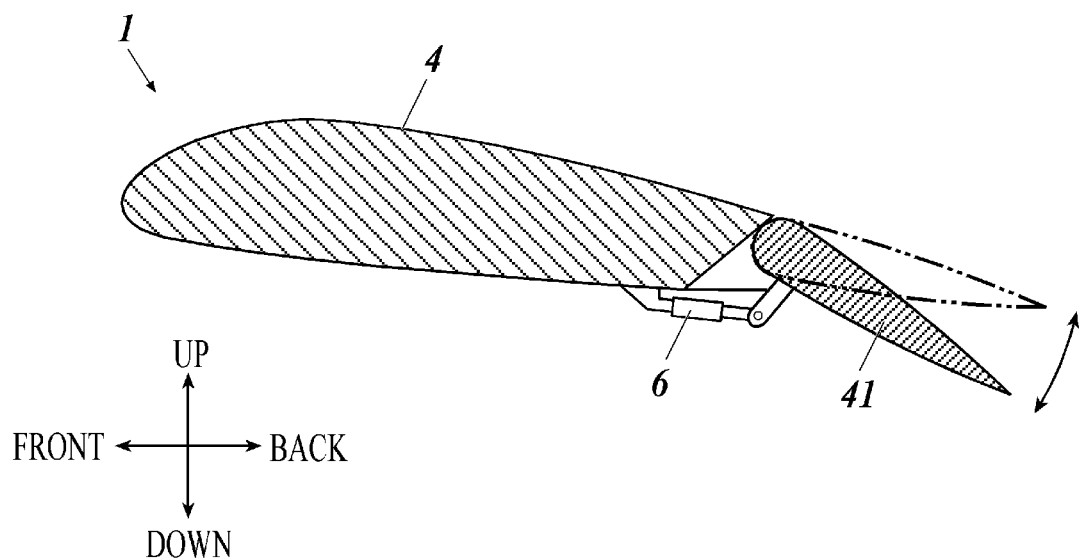
FIG. 2 shows a movable flap that is swingable upward and downward and an actuator for causing the movable flap to swing.

Though in FIG. 2, the actuator 6 or the like are exposed outside the fixed wing 4 for visibility, the actuator 6 may be provided inside the fixed wing 4.

In the present embodiment, the actuator 6 is driven to periodically move the movable flap 41 and changes lift of the fixed wing 4, thereby aerodynamically generating vibration in anti-phase with the vibration by the rotation of the rotor 3.

Figure 3:
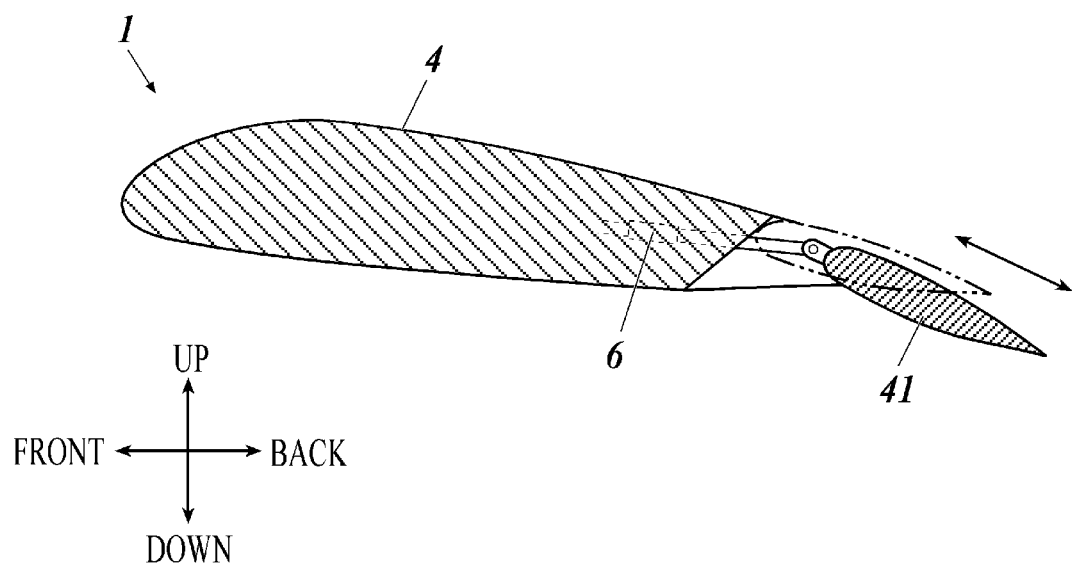
FIG. 3 shows a movable flap that is movable forward and backward and an actuator for causing the movable flap to swing.

In the present embodiment, the movable flap 41 is moved upward and downward as described above. However, the movable flap 41 may be periodically moved forward and backward by the actuator 6 using a piezoelectric element or the like to periodically change the lift of the fixed wing 4, as shown in FIG. 3, for example.

Next, the operation of the vibration control system for the compound helicopter 1 according to the present embodiment is described.

Even with the movable flaps 41 swinging upward and downward as in this embodiment, the movement itself generates small vibration which does not cancel out the vibration caused by the rotation of the rotor 3. However, as the movable flaps 41 are periodically moved to change the lift of the fixed wings 4, vibration of the body 2 of the compound helicopter 1 is aerodynamically generated.

As the vibration caused by the movement of the movable flaps 41 is in anti-phase with the vibration generated by the rotation of the rotor 3, the lift of the fixed wings 4 aerodynamically generated by the periodic movement (for example, swinging) of the movable flaps 41 cancels out the vibration caused by the rotation of the rotor 3. In that way, the vibration of the body 2 (especially in the cabin) of the compound helicopter 1 caused by the rotation of the rotor 3 can be effectively suppressed.

As described above, according to the present embodiment, the vibration control system for the compound helicopter 1 is configured to periodically change the lift of the fixed wings 4 by periodically moving the movable flaps 41 mounted on the rear edges of the fixed wings 4 so as to aerodynamically generate vibration in anti-phase with that generated by the rotation of the rotor 3. The vibration caused by the rotation of the rotor 3 can be thereby effectively suppressed.

In the case where an active vibration control system that causes a lead portion to vibrate cannot be provided at the tip of the fixed wing 4, the vibration control system for the compound helicopter 1 according to the present embodiment can effectively suppress the vibration caused by the rotation of the rotor 3.

In the present embodiment, the movable flap 41 is mounted on each of the fixed wings 4 on the left and right sides of the body 2 of the compound helicopter 1. With that configuration, the left and right movable flaps 41 can be configured to be moved (swinging) with the same period in the same amount of movement (with the same amplitude in the present embodiment).

In this way, the lift in (almost) the same amount can be periodically generated on the left and right fixed wings 4, and the vibration in the up-down direction can be generated on the aircraft by the left and right movable flaps 41.

Further, in a case where a component in the direction of rolling is combined with a component in the up-down direction in the vibration caused by the rotation of the rotor 3, for example, the left and right movable flaps 41 may be configured to be moved with the same period in different amounts of movement. Alternatively, the movable flap 41 on only one of the two fixed wings 4 may be periodically moved.

Figure 4:
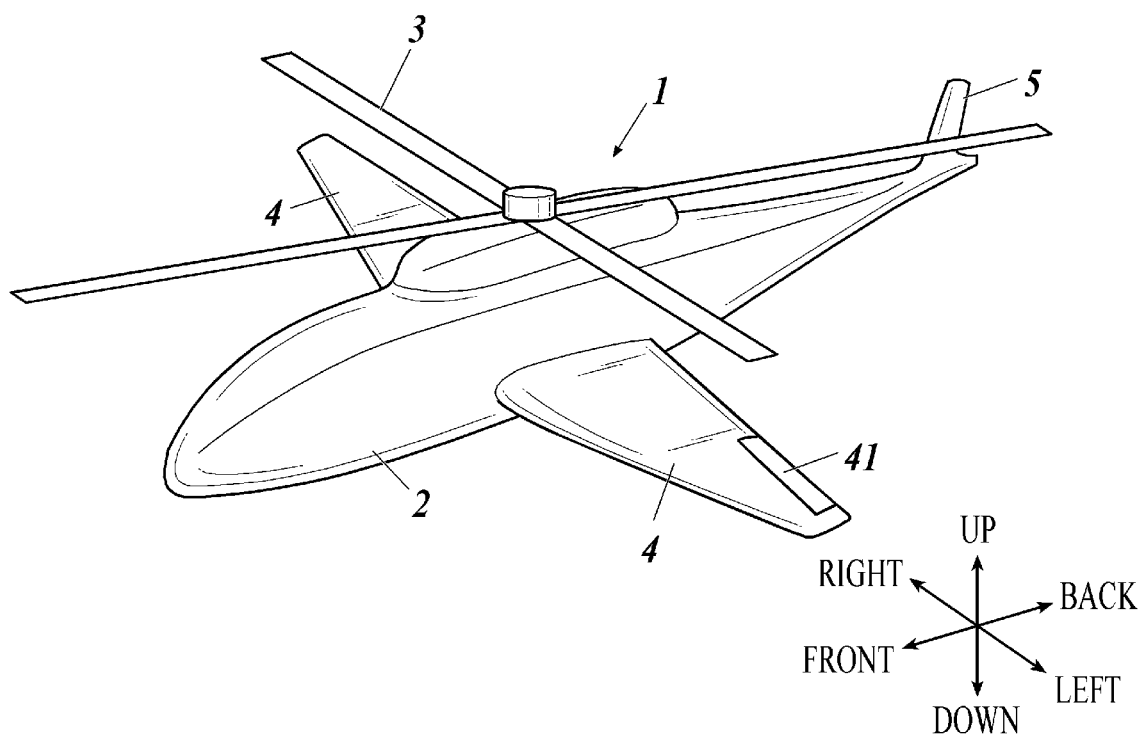
FIG. 4 shows a compound helicopter with a movable flap provided on one of fixed wings.
Figure 5:
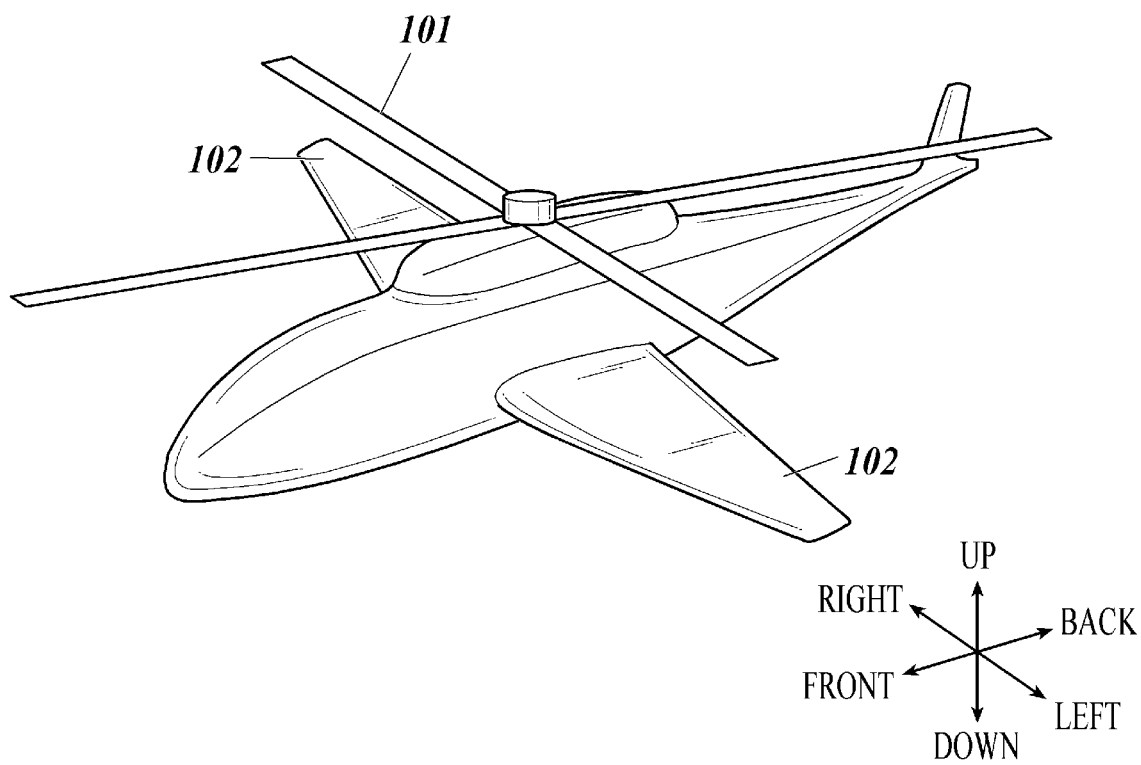
FIG. 5 shows an exemplary configuration of a conventional compound helicopter.

Alternatively, the movable flap 41 may be mounted on only one of the two fixed wings on the left and right sides of the body 2 to be moved, as shown in FIG. 4. In FIG. 4, the movable flap 41 is mounted on the left fixed wing 4 as an example, but the movable flap 41 may be mounted on the right fixed wing 4.

With any of these configurations, it is possible to generate vibration in the rolling direction in addition to the vibration in the up-down direction by moving the movable flap 41.

As such vibration is generated to cancel out the components in the up-down direction and in the rolling direction of the vibration caused by the rotation of the rotor 3, the vibration caused by the rotation of the rotor 3 can be effectively suppressed.

The frequency of the vibration in the periodic movement of the movable flap 41 is about one to four times that of the rotor (with a period of about one to one-fourth that of the vibration) calculated from the rotation speed [rpm] of the rotor 3 according to the number of the blades of the rotor 3.

The timings at which the movable flap 41 is moved may be determined based on the timings at which the rotor 3 swing, for example, or alternatively, based on values measured by a sensor or the like of the vibration caused by the rotation of the rotor 3.

Although some embodiments of the present disclosure have been described and illustrated, the disclosed embodiments are made for purposes of not limitation but illustration and example only, and modifications can be made as needed within the scope of the present disclosure.

What is claimed is:

1. A vibration control system for a compound helicopter with a rotor and a fixed wing,
   wherein the fixed wing includes a movable flap that is mounted on a rear edge of the fixed wing, and
   wherein a relationship of anti-phase between vibration aerodynamically generated by the fixed wing and vibration caused by rotation of the rotor is maintained by the vibration control system periodically moving the movable flap to change lift of the fixed wing.

2. The vibration control system for the compound helicopter according to claim 1,
   wherein the movable flap is swingable upward and downward.

3. The vibration control system for the compound helicopter according to claim 1,
   wherein the fixed wing includes fixed wings on left and right sides of a body of the compound helicopter, and the movable flap is mounted on each of the fixed wings.

4. The vibration control system for the compound helicopter according to claim 2,
   wherein the fixed wing includes fixed wings on left and right sides of a body of the compound helicopter, and the movable flap is mounted on each of the fixed wings.

5. The vibration control system for the compound helicopter according to claim 3,
   wherein the vibration control system moves the movable flap mounted on each of the fixed wings on the left and right sides with a same period and in a same amount of movement.

6. The vibration control system for the compound helicopter according to claim 4,
   wherein the vibration control system moves the movable flap mounted on each of the fixed wings on the left and right sides with a same period and in a same amount of movement.

7. The vibration control system for the compound helicopter according to claim 3, wherein the vibration control system moves the movable flap mounted on each of the fixed wings on the left and right sides with a same period but in an amount of movement different from each other.

8. The vibration control system for the compound helicopter according to claim 4,
wherein the vibration control system moves the movable flap mounted on each of the fixed wings on the left and right sides with a same period but in an amount of movement different from each other.

9. The vibration control system for the compound helicopter according to claim 3,
wherein the vibration control system periodically moves the movable flap on only one of the fixed wings.

10. The vibration control system for the compound helicopter according to claim 4,
wherein the vibration control system periodically moves the movable flap on only one of the fixed wings.

11. The vibration control system for the compound helicopter according to claim 1,
wherein the fixed wing includes fixed wings on the left and right sides of the body of the compound helicopter, and the movable flap is mounted on only one of the fixed wings.

12. The vibration control system for the compound helicopter according to claim 2,
wherein the fixed wing includes fixed wings on the left and right sides of the body of the compound helicopter, and the movable flap is mounted on only one of the fixed wings.

13. The vibration control system for the compound helicopter according to claim 1,
wherein the vibration control system comprises an actuator for moving the movable flap.

14. The vibration control system for the compound helicopter according to claim 2,
wherein the vibration control system comprises an actuator for moving the movable flap.

15. The vibration control system for the compound helicopter according to claim 13,
wherein the actuator includes a piezoelectric element.

16. The vibration control system for the compound helicopter according to claim 14,
wherein the actuator includes a piezoelectric element.

17. The vibration control system for the compound helicopter according to claim 1, wherein the movable flap is movable forward and backward.

18. The vibration control system for the compound helicopter according to claim 1, wherein the movable flap is moved to increase a gap between the movable flap and the fixed wing.

* * * * *